United States Patent [19]
Rossi

[11] 3,792,531
[45] Feb. 19, 1974

[54] DENTAL RESTORATIVE MATERIAL OF IMPROVED POLISHABILITY

[75] Inventor: Carl J. Rossi, Orange, Calif.

[73] Assignee: Lee Pharmaceuticals, South El Monte, Calif.

[22] Filed: Dec. 28, 1970

[21] Appl. No.: 102,045

[52] U.S. Cl. .................................................. 32/15
[51] Int. Cl. ............................................... A61k 5/02
[58] Field of Search ............................... 32/15, 8, 2

[56] References Cited
UNITED STATES PATENTS
3,449,832  6/1969  Connan ..................................... 32/8
3,452,437  7/1969  Chang ..................................... 32/15

*Primary Examiner*—Robert Peshock

[57] ABSTRACT

Dental restorative compositions which are a blend of a liquid polymerizable organic binder and a filler comprising vitreous particles having diameters between about 0.700 microns and 30 microns wherein said particles average by weight between 2 and 20 microns in diameter, at least one half by weight of said particles have a size range of less than 20 microns. A preferred filler is crystalline quartz wherein the particles have diameters between 0.700 microns and 30 microns and average by weight between 2 and 20 microns in diameter, and wherein 80 percent by weight of said particles are under 20 microns in diameter and at least 20 percent by weight of said particles are under 5 microns in diameter.

8 Claims, No Drawings

DENTAL RESTORATIVE MATERIAL OF IMPROVED POLISHABILITY

BACKGROUND OF THE INVENTION

1. Field of the Invention

This invention is concerned with a dental restorative composition comprising a blend of liquid polymerizable organic binder and particles of a solid inorganic filler.

2. Description of the Prior Art

Dental restorative compositions comprised of a blend of liquid polymerizable organic binder and a solid inorganic filler are known to the art.

Such compositions are described for example in U.S. Pat. No. 3,066,112, Bowen. It is disclosed in Bowen, for example, that a dental restorative composition comprised of from 17 to 30 percent by weight of a thermosetting resin such as

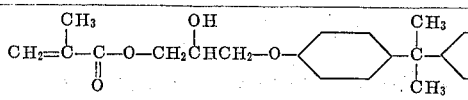 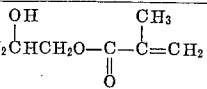

which is the glycidyl methacrylate derivative of bis phenol-A, sometimes referred to as BIS-GMA, and from 83 to about 70 percent by weight of a filler such as fused silica of a size which will pass through a number 325 sieve of the U.S. Standard Sieve Series, is a fairly satisfactory filling material having compressive strengths of up to 23,000 p.s.i.

In U.S Pat. application Ser. No. 736,950 filed on June 14, 1968, there is described a dental restorative material of the same general type as utilized in the Bowen patent wherein the resin binder and inorganic filler are packaged in two separate packages prior to preparation for use in a dental filling. Each package contains from 65 to 75 percent by weight of inorganic filler, the remainder being primarily thermosetting resin binder. The first package, in addition, contains a catalyst for the thermosetting resin and the second package contains the activator for the catalyst. A typical catalyst employed is benzoyl peroxide and common activator is para-toluene sulfinic acid. In the application Ser. No. 736,950 the finely divided filler is an inorganic material such as fused silica, aluminum oxide, crystalline quartz, small glass beads, and the like. The filler employed in the composition of application Ser. No. 736,950, may have a particle size in the broad range of 5 microns up to 150 microns. It is further disclosed in Ser. No. 736,950 that a tendency for the binder system and finely divided filler to separate slightly may be minimized by the inclusion of from 1 to 4 percent by weight of sub-micron size filler particles. For example, where the filler comprised aluminum oxide having a particle size of from 10 microns to 50 microns, 1 to 4 percent of sub-micron size flocculated silica was added which substantially prevented the separation of the aluminum oxide and binder.

The size of the particles of the inorganic fillers employed by the prior art has generally encompassed relatively large ranges such as 5 to 150 microns as noted above, tppically from 20 to 75 microns, or 10 to 50 microns. It has previously been considered that this rather large distribution of particle sizes was necessary to aid in the proper packing of a filling so as to conform readily to the cavity and to seal properly.

The polishability of the foregoing restorative compositions has not been completely satisfactory. In the foregoing prior art restorative compositions wherein the particles of inorganic filler are of the sizes indicated, and the size of the particles is distributed over a wide range of diameters, it has proven very difficult, if not impossible, to obtain a very satisfactory polish of fillings comprised of such restorative compositions. If in order to obtain a satisfactory polishability, softer materials were employed, there was a subsequent loss in hardness and other desirable properties such as compressive strength and the like. For example, when coarse glass beads such as to pass a 200 or 325 mesh sieve were employed to increase the polishability, very soft restoratives resulted.

In cases of restorative compositions where quartz was employed because of its highly desirable qualities of hardness, chemical inertness, refractive index translucency, and low coefficient of thermo-expansion, it was extremely difficult to obtain a high degree of polish using techniques commonly employed by the practicing dentist.

The wide range of diameters present in previously employed inorganic fillers resulted in the cured surface of the dental restorative being interspersed in many places with relatively large boulders, ofter greater than 50 microns in size. These larger particles were in turn loosely held by the resin binder and were thus susceptible to being gouged out by routine polishing techniques.

In addition, the larger particles when subjected to the action of the polishing tool tend to form a pumice which abrades and prevents the formation of a smooth glossy surface. In the matrix system of such restorative compositions, the presence of unusually large particles produced defect areas, since in the immediate vicinity of the larger particles the composition of the matrix was grossly different from the overall bulk of the resin-filler composition. In other words, in such areas of large particles the resin-filler ratio is very significantly altered. This is a critical factor since the physical properties of the dental restorative composition depend to a high degree upon the uniformity of the resin-filler dispersement.

SUMMARY OF THE INVENTION

The principal object of the present invention is to provide a dental restorative composition of the type comprising a blend of the liquid polymerizable organic resin and a solid inorganic filler having greatly improved polishability, without any appreciable loss of other essential properties such as tensile strength, compressive strength, translucency, hardness, and adaptability to "pack" the filling properly, and the like.

It has been discovered that greatly improved polishability characteristics of dental restoratives of the type comprising a blend of a thermosetting resin and inorganic filler can be obtained without detrimental effects on other properties such as hardness, compressive strength, tensile strength, translucency, and the like, and in many cases improving such properties, by employing inorganic fillers of the same chemical formulations as previous filler compositions but of much smaller particle size and much narrower range of distribution of sizes.

DESCRIPTION OF THE PREFERRED EMBODIMENTS

The objects of the present invention are achieved by utilizing inorganic fillers for thermosetting resin dental restorative compositions which have much smaller average, and maximum particle sizes, and a much narrower range of particle size distribution than previously employed fillers, having a particle size distribution ranging from submicron to not more than 30 microns. Additionally, the particles of the filler of the present invention must have an average by weight of from 2 to 20 microns and at least one half by weight of said particles have a size range of less than 20 microns. Preferably 80 percent by weight of the inorganic filler particles should have diameters of less than 20 microns and at least 20 percent by weight of the particles should have diameters of less than 5 microns. It is further desirable that an appreciably significant portion of the particles be of the order of a micron or submicron in size but above the size of the wavelength of visible light (approximately 0.700 microns). The presence of any appreciable amount of particles having a diameter less than the wavelength of visible light tends to adversely affect the translucency of the restorative.

The present invention is generally applicable to the known thermosetting resin-type dental restoratives which utilize vitreous fillers, particularly quartz.

The dental restorative compositions of the present invention may be prepared according to known methods of the prior art such as those employed in U.S. Pat. No. 3,066,112 or in application Ser. No. 736,950 filed June 14, 1968, referred to previously, utilizing fillers specified according to the present invention.

While the BIS-GMA may be the only bis phenol-A backbone containing monomer in the system, the system may be modified through the inclusion of other bis phenol-A backbone monomers. The BIS-GMA will usually comprise about 80 percent or more of the binder system with an active diluent monomer or monomers making up the balance of the interpolymerizable monomers present. Typical diluent reactive monomers that may be added are methyl methacrylate and glycol dimethacrylates such as ethylene glycol dimethacrylate through tetraethylene dimethacrylate. Triethylene glycol dimethacrylate is the preferred diluent monomer. Thus in general the resin binder is comprised of a resin binder system containing an active polyfunctional monomer having a central portion which contains at least one aromatic ring and at least two acrylic end groups.

As indicated, any of the previously employed inorganic fillers may be used such as fused silica, aluminum oxide, crystalline quartz, small glass beads and the like, provided that the particle size specifications of the filler are in accordance with those specified above defining this invention.

The preferred filler according to the present invention is single crystalline quartz. Several factors have warranted the selection of quartz as the preferred filler, among them, its hardness, chemical inertness, refractive index, translucency, low coefficient of thermal expansion, and high purity. While in previous filler compositions the hardness of quartz was important for the physical restorative integrity of the filling composition, it was also a hindrance for the rapid in-place polishing techniques employed by the dentist in day-to-day practice. According to the present invention, however, it is possible to maintain these desirable qualities of the quartz filler in the restorative composition, but at the same time greatly increase the polishability of the dental restorative.

It is manifest of course that the polishability of other softer fillers is also improved according to the teachings of the present invention.

The filler compositions utilized in this invention may be prepared according to the usual grinding, screening, and the like techniques. Generally the filler material is first ground and screened through a No. 325 mesh. It is then treated in a ceramic ball mill for, depending upon the particular filler and fineness desired, up to 20 hours.

The filler should be ground for sufficient time to assure that there are essentially no particles larger than 30 microns. Fines of less than about 0.700 microns in diameter must be substantially separated out to insure translucency. The Andreason Pipette is a very useful tool in determining the particle size and distribution, but any of many known methods may be used to assure that the particle size and distribution according to this invention is obtained.

The finely divided filler may be treated with the keying agent to improve the bond between the filler and bonding resin, for example, in the manner described in U.S. Pat. No. 3,066,112 wherein an aqueous solution of tris(2-methoxy ethoxy) vinyl silane is catalyzed with sodium hydroxide to give a pH of 9.3 to 9.8, and the filler treated with this solution, for example, one-half percent of the silane being used per weight of quartz. A slurry so formed is dried at about 125°C. and cooled.

To a portion of the thus treated filler a peroxide catalyst such as for example 1.25 percent by weight of benzoyl peroxide, based on the weight of the binder is added and blended together. To a suitable amount of the liquid resin binder there is added 0.5 to 1 percent by weight based upon the weight of the binder of an activator, such as for example dimethyl-paratoluidine or para-toluene sulfinic acid. The filler material containing the catalyst and the resin containing the activator may then be thoroughly mixed together and placed in the cavity of the tooth to be filled. The binder polymerizes at mouth temperatures to harden the filling within approximately 10 minutes. The selection of the particular catalyst and activator and the amounts thereof are within the skill of the prior art depending upon the particular resin amount thereof employed.

The following examples describing certain specific embodiments of the invention will serve to further illustrate the nature of the invention.

EXAMPLE 1

Single crystalline quartz which has been screened through 325 mesh (less than 44 microns) is placed in a ceramic ball mill for 16 hours to reduce the particle size. The resulting powdered quartz is acid washed with dilute hydrochloric acid, dried and treated with a ½ percent solution of tris(2-methoxyethoxy)vinyl silane which has been catalyzed with sodium hydroxide. The slurry which is formed is then dried at about 125°C. and cooled. The ground quartz has the following distribution of particle sizes:

| Particles Size Dia. (Microns) | Percent by Weight Finer Than |
|---|---|
| 29.8 | 100 |
| 22.3 | 89.8 |
| 18.4 | 82.6 |
| 14.9 | 69.3 |
| 12.7 | 60.0 |
| 10.3 | 49.1 |
| 8.3 | 41.5 |
| 7.1 | 35.8 |
| 5.6 | 29.1 |
| 4.9 | 25.8 |
| 3.9 | 21.3 |
| 3.4 | 18.5 |
| 3.0 | 16.5 |
| 2.7 | 15.7 |

Particles having diameters less than about 0.700 microns are discarded from the thus treated quartz.

75 parts by weight of the selected quartz particles are blended with 25 parts by weight of a binder comprised of BIS-GMA prepared according to the methods disclosed in the Bowen patent, U.S. Pat. No. 3,066,112. To this blend are added 1.25 parts by weight of the binder of benzoyl peroxide catalyst together with from about 0.5 to 1 part by weight of the binder of an activator such as dimethyl-para-toluidine. The composition when placed in a prepared tooth cavity and hardens within less than 10 minutes.

In order to examine the polishability qualities of the dental restorative of this example, portions of the blended formulation are formed into test discs (1 inch in diameter by three thirty-seconds of an inch thick). One-half of the face of each test disc is roughened with a carbide disc and thereafter one-quarter of the thus roughened surface polished with a rag wheel and tripoli. The samples thus polished are examined by dental technicians and dentists and exhibit a highly satisfactory gloss. Fillings made with the restorative material of this example have high compressive strengths well within the standards of the American Dental Association Specification No. 9.

EXAMPLE 2

A sample of commercially available Brazilian quartz powder is dry screened through a series of successively finer mesh sizes and has the following particle size distribution:

| Particle Size (Microns) | Screen Size (Mesh) | Weight Percent |
|---|---|---|
| > 74 | < 200 | 32.0 |
| 63 < 74 | 200–230 | 12.5 |
| 53 < 63 | 230–270 | 15.5 |
| 44 < 53 | 270–325 | 12.5 |
| < 44 | > 325 | 27.5 |

Each of the narrow particle size screen cuts in the above table is formulated into a dental restorative composition following the procedure of Example 1 and formed into a test disc. Each disc is roughened with a carbide disc and in turn polished as in Example 1 and examined by the same dental technicians and dentists. In each instance a comparison of the polished discs with those of the Example 1 reveals that the dental restorative of Example 1 exhibits outstandingly superior qualities of smoothness and gloss compared to each of the test discs in this example.

EXAMPLE 3

A resin binder is prepared by blending together 95 parts BIS-GMA and 17 parts triethylene glycol dimethacrylate. The thus blended resin is then divided into two equal portions. To 25 parts of the first portion there are added 75 parts by weight of the ball milled quartz of Example 1 and 2 parts by weight of the resin of benzoyl peroxide. To 25 parts of the second portion there is also added 75 parts by weight of the ball milled quartz of Example 1 and 2 parts by weight of N,N-dimethyl-p-toluidine to 98 parts by weight of the resin. The two portions are then blended in approximately equal proportions of material from each previous portion. A part of the resulting blend is placed in a pre-prepared cavity of an extracted tooth where it hardens in approximately 2 minutes from the time that the material from the two portions has been blended. Part of the material is formed into a test disc for polishing as in Example 1. The polished portion of the test disc exhibited very satisfactory gloss after polishing. The compressive strength of the dental restorative of this example after 1 hour cure is 37,000 pounds per square inch on the average according to the American Dental Association Specification No. 9.

I claim:

1. In a method for filling a cavity in a tooth which includes the steps of filling said cavity with a blend of an initially liquid polymerizable organic binder and a solid inorganic filler, and thereafter hardening said blend in situ, the improvement to produce a filling having a hard, smooth, polished surface which comprises utilizing as said filler one consisting essentially of vitreous particles having diameters between about 0.700 microns and 30 microns, said particles averaging by weight between 2 and 20 microns in diameter, at least one-half by weight of said particles have a size range of less than 20 microns, and then polishing the tooth surface containing said filling.

2. A method as claimed in claim 1 wherein at least 80 percent by weight of said particles are under 20 microns in diameter.

3. A method as claimed in claim 1 wherein 20 percent by weight of said particles are under 5 microns in diameter.

4. A method as claimed in claim 2 wherein 20 percent by weight of said particles are under 5 microns in diameter.

5. In a method for filling a cavity in a tooth which includes the steps of filling said cavity with a blend of initially liquid polymerizable organic binder and a solid inorganic filler, and thereafter hardening said blend in situ, the improvement to produce a filling having a hard, smooth, polished surface which comprises utilizing as said filler one consisting essentially of single quartz particles having diameters between about 0.700 microns and 30 microns, said particles averaging by weight between 2 and 20 microns in diameter, and at least one-half by weight of said particles have a size range of less than 20 microns, and then polishing the tooth surface containing said filling.

6. A method as claimed in claim 5 wherein at least 80 percent by weight of said particles are under 20 microns in diameter.

7. A mehtod as claimed in claim 5 wherein 20 percent by weight of said particles are under 5 microns in diameter.

8. A method as claimed in claim 6 wherein 20 percent by weight of said particles are under 5 microns in diameter.

* * * * *